United States Patent [19]
Lee

[11] Patent Number: 5,636,278
[45] Date of Patent: Jun. 3, 1997

[54] PLAYER FOR PICTURE CONCEALMENT AND CONCEALMENT RELEASE

[75] Inventor: Duck-woo Lee, Anyang, Rep. of Korea

[73] Assignee: Samsung Electronics Co., Ltd., Kyungki-do, Rep. of Korea

[21] Appl. No.: 421,225

[22] Filed: Apr. 13, 1995

[30] Foreign Application Priority Data

Apr. 13, 1994 [KR]  Rep. of Korea ........................ 94-7752

[51] Int. Cl.$^6$ ................................................ H04N 7/167
[52] U.S. Cl. ................................ 380/15; 380/10; 380/20
[58] Field of Search ................................ 380/10, 15, 20, 380/23

[56] References Cited

U.S. PATENT DOCUMENTS

| | | | |
|---|---|---|---|
| 3,184,537 | 5/1965 | Court | 380/15 |
| 3,201,511 | 8/1965 | Doundoulakis | 380/15 |
| 4,095,258 | 6/1978 | Sperber | 380/15 |
| 4,163,252 | 7/1979 | Mistry, et al. | 380/15 |
| 4,323,922 | 4/1982 | den Toonder, et al. | 380/15 |
| 4,408,225 | 10/1983 | Ensigner et al. | 380/15 |

*Primary Examiner*—David C. Cain
*Attorney, Agent, or Firm*—Sughrue, Mion, Zinn, Macpeak & Seas

[57] ABSTRACT

A player for concealing a picture or releasing picture concealment using a secret code provided by a user while recording and/or reproducing of a video signal with respect to a recording medium includes a secret code signal for generating either a first code signal used for picture concealment during a recording mode of operation or a second code signal for picture concealment release during reproducing mode of operation, a secret code signal output unit for providing the first secret code signal at a moment determined with respect to a predetermined portion of an input video signal, a picture concealing generator for inserting the first secret code signal into a vertical blanking section of the input video signal while eliminating the horizontal sync signals of a corresponding field to thereby generate and record a video signal on the recording medium. The player also includes a secret code signal detector for detecting the first secret code signal from the video signal read out from the recording medium, a code discriminator for determining whether the second secret code signal is identical to the first secret code signal detected from the recording medium, and a horizontal sync signal inserter for re-inserting the horizontal sync signals into readout video signal when the secret code signals are identical to each other. The player may be connected to a display unit. Accordingly, an unauthorized person can be prevented from viewing recorded picture information.

14 Claims, 3 Drawing Sheets

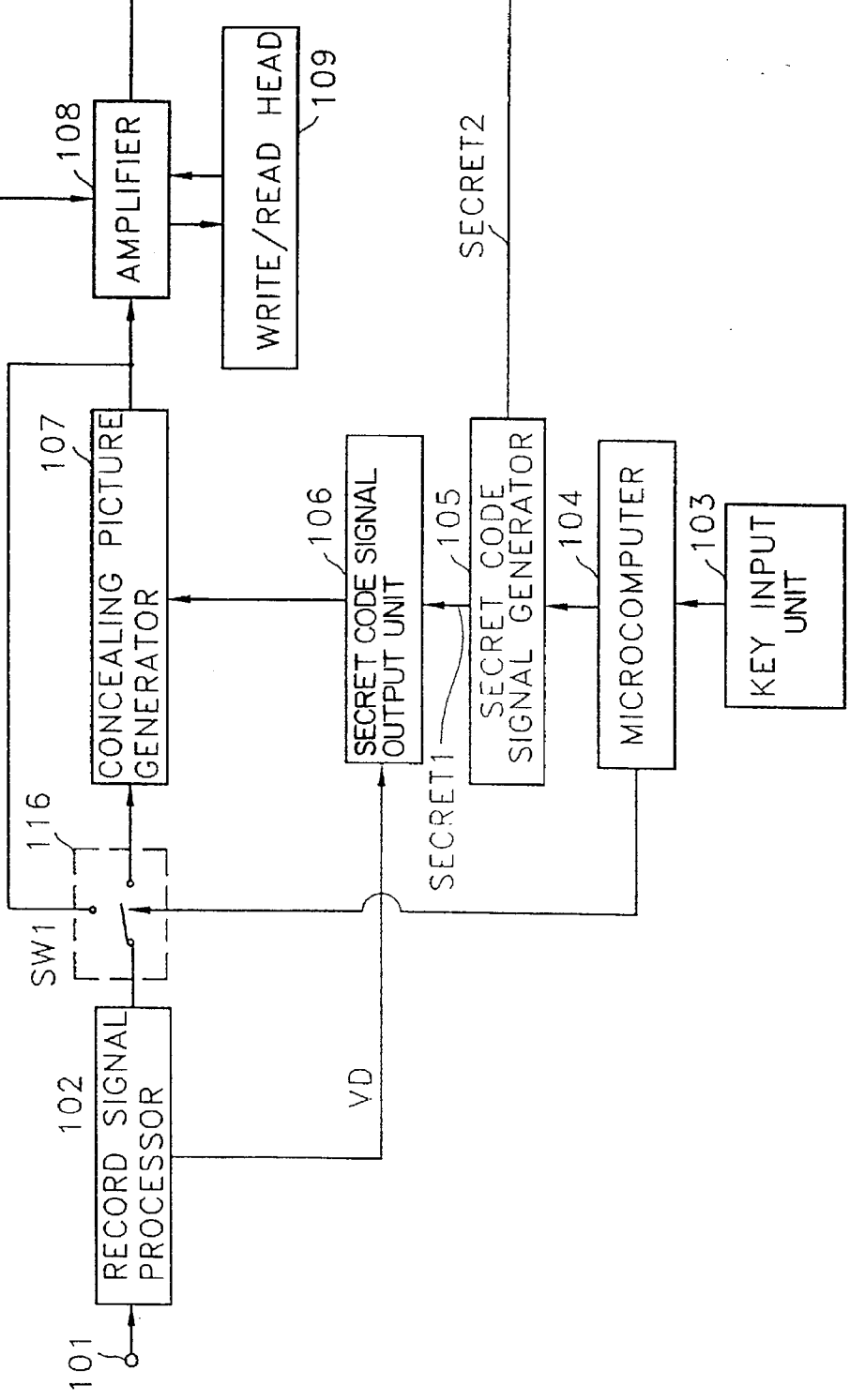

PLAYER FOR PICTURE CONCEALMENT AND CONCEALMENT RELEASE

BACKGROUND OF THE INVENTION

1. Field of the Invention

The present invention relates to a player for concealing a picture and, more particularly, to a player for picture concealment and concealment release which conceals a picture during the recording of a video signal, and releases picture concealment under control of a user with respect to the picture when being reproduced.

The instant application is based on Korean Patent Application No. 94-7752, which is incorporated herein by reference for all purposes.

2. Discussion of Related Art

In order to hide a picture, a specific picture has been subjected to so-called mosaic processing prior to being recorded to inhibit an unauthorized viewer from observing the picture. However, mosaic processing creates a problem that even an authorized viewer has difficulty in restoring the original picture properly.

SUMMARY OF THE INVENTION

The principal object of the present invention is to solve the above-described problem.

One object of the present invention is to provide a player for picture concealment and concealment release which eliminates sync signals while loading a secret number on a video signal to enable only a viewer possessing the secret number to reproduce the video signal. In an exemplary case, a player system may include a video cassette recorder (VCR) connected to a monitor.

Another object of the present invention is to provide a player for picture concealment and concealment release, which player performs picture concealment in a video signal using a secret number while eliminating sync signals and releasing picture concealment using the secret number during the reproduction of the image-concealed video signal.

These and other objects, features and advantages of the present invention, are provided by a player for picture concealment and concealment release during respective recording and reproducing modes of operations of a video signal with respect to a recording medium. The player includes a head, a key input unit, and a secret code generator generating either one of a first secret code signal corresponding to a recording mode or a second secret code signal corresponding to a reproducing mode in response to operation of a key in the key input unit by the user. A picture concealing unit, receiving an externally provided first video signal, generates a second video signal by inserting the first secret code signal at a preset, i.e., predetermined, position in the first video signal while eliminating horizontal sync signals from the first video signal, and supplies the thus-generated second video signal to the head for recording. An information detector receives the second video signal read out via the head, detects information at the preset position of the received second video signal, and outputs the detected information and second video signal. The player also includes a secret code discriminator, which determines whether the second secret code from the secret code generator is identical to the detected information or not, and a picture concealment releasing unit supplies either one of the second video signal from the information detector and a third video signal obtained by inserting the horizontal sync signals, which signals were eliminated by the picture concealing unit, to the second video signal in response to the determination made by the secret code discriminator. Additionally, a display portion displays the video signal output from the picture concealment releasing unit.

These and other objects, features and advantages of the present invention are provided by a player for picture concealment and concealment release during respective recording and reproducing modes of operation of a video signal with respect to a recording medium. The player advantageously includes a head, a key input unit, and a secret code generator, which selectively generates a picture concealing section signal and a first secret code signal during a recording mode and a second secret code signal for releasing the picture concealment during a reproducing mode in response to operation of a key in the key input unit by the user. The player additionally includes a picture concealing unit, receiving an externally provided first video signal, for generating a second video signal lacking horizontal sync signals and containing the first secret code signal at a preset position, and a first switch for supplying the first video signal to the head during an interval wherein neither the second video signal nor the picture concealing section signal are supplied for recording on the recording medium. The player preferably includes an information detecting unit, which receives a recorded one of the first and the second video signals recorded on the recording medium and read out via the head, and detects information at the preset position of the received one of the first and the second video signals. The player also includes a secret code discriminating unit, which determines whether the second secret code from the secret code generating unit is identical to the information detected by the information detecting unit or not when the second secret code signal is supplied from the secret code generating unit, and outputs the result of that determination. In addition, the player includes a picture concealment releasing unit, which supplies either the recorded one of the first and the second video signals from the information detecting unit or a third video signal, which signal is obtained by inserting the eliminated horizontal sync signals, which were previously eliminated by the picture concealing unit, into the second video signal in response to the determination made by the secret code discriminating unit. A display unit is connected to the player and presents the video signal from the picture concealment releasing unit on a screen.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A preferred embodiment of a magnetic tape player for picture concealment and concealment release according to the present invention will be described with reference to FIGS. 1A—1B and 2A—2D.

Figures 1A, 1B:
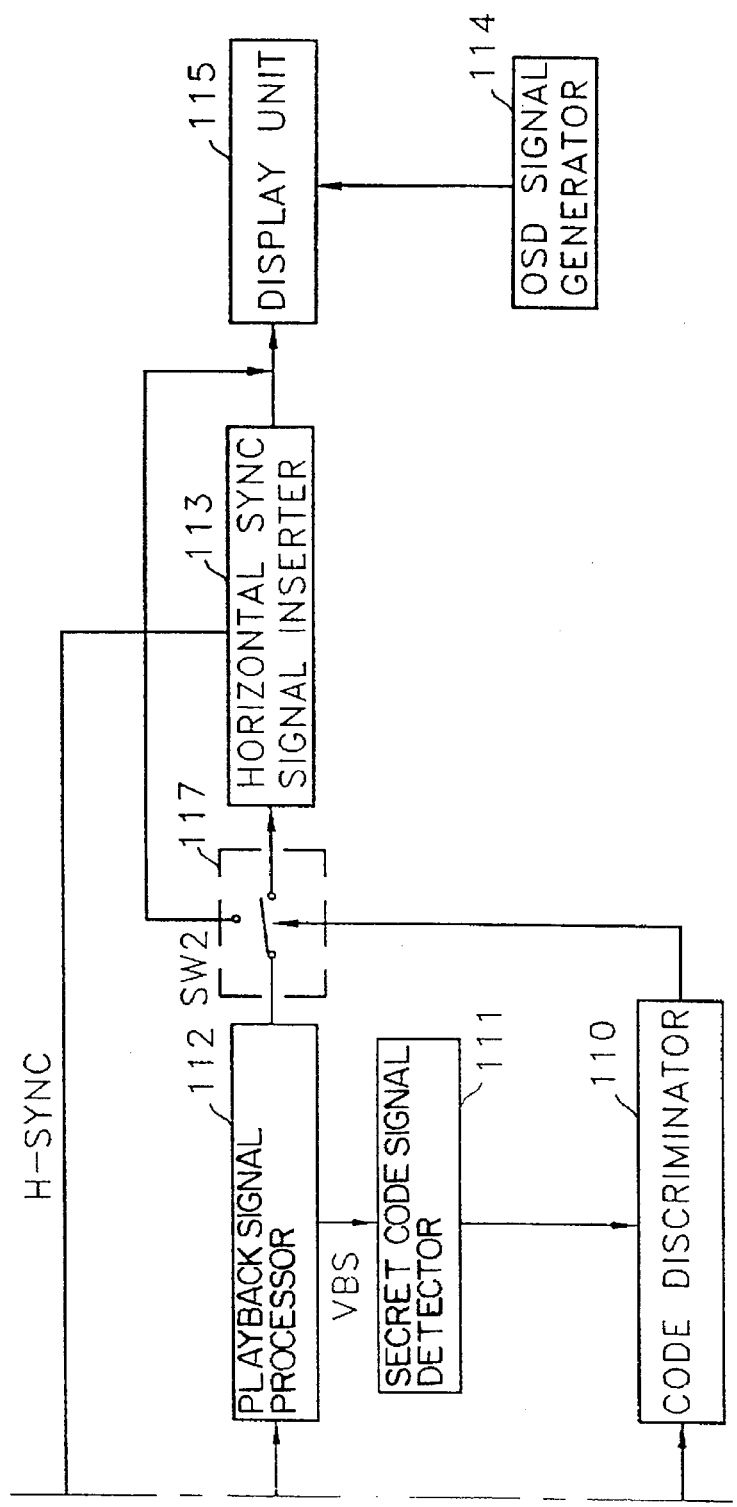
FIGS. 1A and 1B collectively form a block diagram showing a preferred embodiment of a magnetic tape player according to the present invention.

Referring collectively to FIGS. 1A and 1B, a record signal processor 102 receives a first composite video signal VBS1 through a signal input terminal 101, and outputs the first composite video signal VBS1 and a vertical sync signal VD. The first composite video signal VBS1 is supplied to a concealing picture generator 107, and the vertical sync signal VD is supplied to a secret code signal output unit 106. A key input unit 103 is provided with a plurality of keys used in image concealing section setting, picture concealment release, selection of record/playback mode and secret number input. A microcomputer 104 connected to the key input unit 103 generates a picture concealment start/end signal, a picture-concealment release signal, a record/playback mode signal and a secret number signal corresponding to the user's key input manipulation. The picture concealment start/end signal is used for controlling the switching of a first switch 116. The picture concealment release signal, record/ playback mode signal and secret number signal are supplied to a secret code signal generator 105 which then produces either a first secret code signal SECRET1 or a second secret code signal SECRET2 corresponding to the secret number signal in accordance with the record/playback mode signal. The first secret code signal SECRET1 is supplied to a secret code signal output unit 106, and the second secret code signal SECRET2 is supplied to a code discriminator 110. The secret code signal output unit 106 provides the first secret code signal SECRET1 to the concealing picture generator 107 responsive to the vertical sync signal VD. The concealing picture generator 107, thus supplied with the first secret code signal SECRET1 and first composite video signal VBS1, generates a second composite video signal VBS2 including the first secret code signal SECRET1 inserted therein while eliminating horizontal sync signals therefrom. The first switch 116 selectively provides the output signal VBS1 from the record signal processor 102 to either the concealing picture generator 107 or an amplifier 108 under the control of the microcomputer 104 which is a controlling unit. The amplifier 108 supplies the first composite video signal VBS1 from the first switch 116 or the second composite video signal VBS2 from the concealing picture generator 107 to a write/read head 109.

A playback signal processor 112 demodulates the first composite video signal VBS1 or the second composite video signal VBS2 read out from a magnetic tape (not shown) via the write/read head 109 and amplifier 108, to produce the result to a secret code signal detector 111 and a second switch 117. The secret code signal detector 111 is supplied with the first or second composite video signal VBS1 or VBS2 to detect information at an inserting position of the first secret code signal SECRET1, thereby supplying the detected information to the code discriminator 110. The code discriminator 110 is supplied with the second secret code signal SECRET2 generated by the secret code signal generator 105 and the information detected by the secret code signal detector 111 to determine whether the two inputs are the same signal or not, and controls the second switch 117 in accordance with the result of the comparison. The second switch 117 selectively supplies the composite video signal VBS1 or VBS2 from the playback signal processor 112 to either one of a horizontal sync signal inserter 113 or a display unit 115 under the control of the code discriminator 110.

The horizontal sync signal inserter 113 inserts the horizontal sync signal to the input composite video signal to thereby generate a third composite video signal VBS3. Preferably, the horizontal sync signal inserter 113 generates a reference horizontal sync signal H SYNC for supply to the amplifier 108. The display unit 115 is connected to receive the composite video signal VBS1 or VBS2 from the second switch 117, third composite video signal VBS3 from the horizontal sync signal inserter 113, and an on screen display (OSD) signal from an OSD signal generator 114.

Hereinafter, the picture concealing operation via the signal recording of the player shown in FIGS. 1A and 1B will be described.

Once the record mode key, concealing section set key, and secret number key are pressed via the key input unit 103, the microcomputer 104 generates a corresponding recording mode signal, picture concealment start signal and secret number signal, and controls the player shown in FIGS. 1A and 1B to perform the signal recording operation with respect to the magnetic tape. In response to the picture concealing start signal, the first switch 116 supplies the output signal from the record signal processor 102 to the concealing picture generator 107. When the record mode signal and secret number signal are supplied from the microcomputer 104, the secret code signal generator 105 produces and supplies the first secret code signal SECRET1, corresponding to the secret number signal, to the secret code signal output unit 106. The secret code signal output unit 106 stores the first secret code signal SECRET1 from the secret code signal generator 105. When the recording operation has started, the record signal processor 102 detects the vertical sync signal from the first composite video signal VBS1 externally supplied via the input signal terminal 101, and modulates the first composite video signal VBS1 to have a form recordable onto the magnetic tape to supply the result to the first switch 116. The secret code signal output unit 106 supplies the stored first secret code signal SECRET1 to the concealing picture generator 107 at a timing that is determined by the vertical sync signal VD from the record signal processor 102.

Figure 2A:
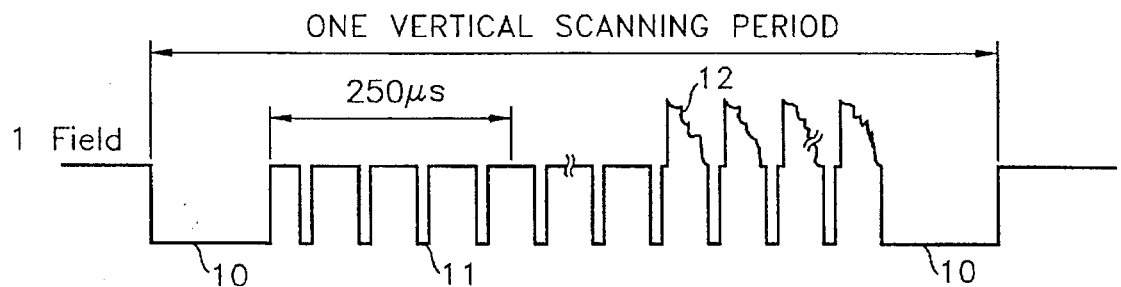
FIGS. 2A to 2D are views for illustrating the picture concealment carried out by the magnetic tape player shown in FIGS. 1A and 1B.
Figure 2B:
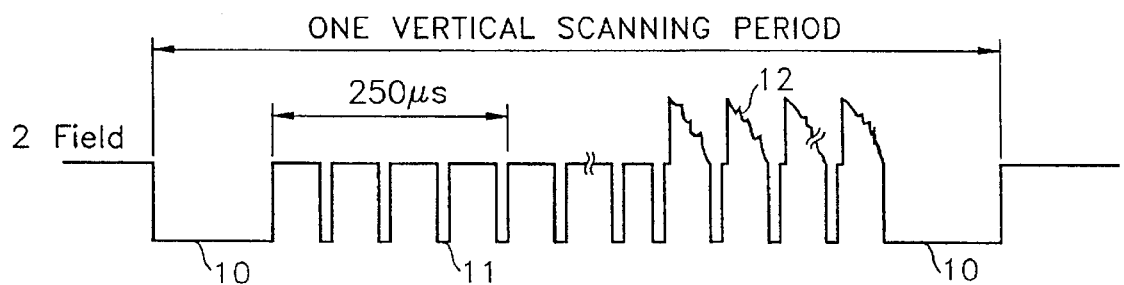

The process of producing the second composite video signal VBS2 by the concealing picture generator 107 will now be described with reference to FIGS. 2A to 2D. FIGS. 2A to 2D represent one vertical scanning period of the composite video signal, in which FIG. 2A schematically illustrates the video signal with respect to a first field while FIG. 2B schematically illustrates the video signal with respect to a second field. The video signal of one field is formed of vertical sync signals 10 at both ends, a plurality of horizontal sync signals 11 between the vertical sync signals 10 and luma•chroma signals 12 loaded between the horizontal sync signals 11. The time interval of a signal section without identifying the luma•chroma signals 12 corresponds to a vertical blanking section.

Figure 2C:
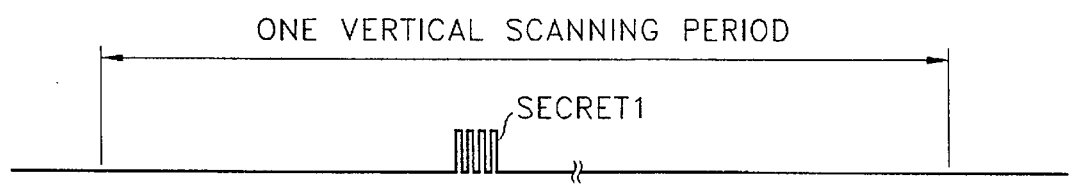

FIG. 2C illustrates one example of the first secret code signal SECRET1 from the secret code signal output unit 106. The first secret code signal SECRET1 consists of four pulses and is inserted after 250 μsec have elapsed from the vertical sync signal by means of the secret code signal output unit 106. Since the first secret code signal SECRET1 is formed of four pulses, the user can use 16 different secret codes.

Figure 2D:
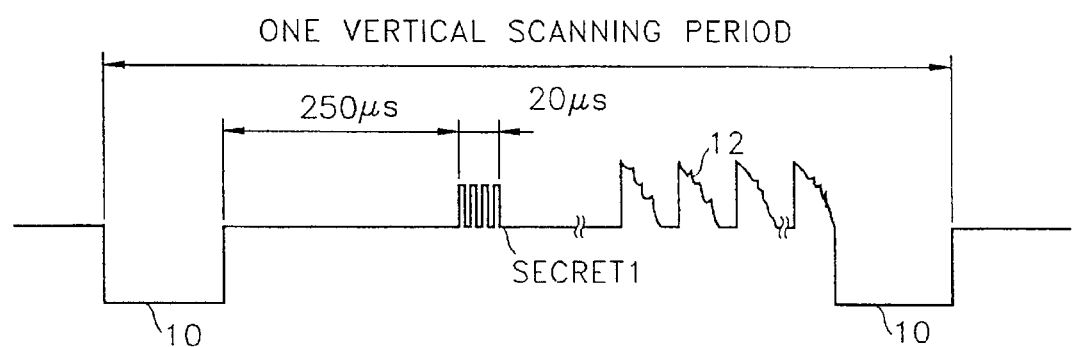

FIG. 2D illustrates the video signal of one field inserted with the first secret code signal SECRET1. The section occupied by the first secret code signal SECRET1 in the second composite video signal occupies 20 μsec following 250 μsec when using the vertical sync signal as a reference. By this formation, there is no need to separately change the inserting position of the first secret code signal SECRET1 for the purpose of making a video signal of the NTSC system coincide with even and odd fields.

The concealing picture generator 107 inserts the first secret code signal SECRET1 into each vertical blanking section of the first composite video signal VBS1 from the first switch 116, and eliminates the horizontal sync signals within the field to which the first secret code signal SECRET1 is inserted. The number of the horizontal sync signals eliminated by the concealing picture generator 107 is properly determined so as not to reproduce the field on a picture. The second composite video signal VBS2 produced by the concealing picture generator 107, as shown in FIG. 2D, is supplied to the amplifier 108.

When a picture concealing key is newly received via the key input unit 103 from the user, the microcomputer 104 generates and supplies a picture concealment end signal to the first switch 116 which, in turn, provides the output of the record signal processor 102 to the amplifier 108 in response to the input picture concealment end signal. The amplifier 108 appropriately decreases (or amplifies) the first composite video signal VBS1 from the first switch 116 or the second composite video signal VBS2 from the concealing picture generator 107 and supplies it to the write/read head 109, which advantageously records the supplied signal on the magnetic tape.

A method for reproducing the composite video signal VBS1 or VBS2 recorded as above will be described below.

Once the player shown in FIGS. 1A and 1B is set to a playback mode by the user's key manipulation via the key input unit 103, the microcomputer 104 generates and outputs the playback mode signal to the secret code signal generator 105. At this time, the composite video signal VBS1 or VBS2 read out by the write/read head 109 is supplied to the playback signal processor 112 via the amplifier 108. The playback signal processor 112 demodulates the input signal to supply the result to the secret code signal detector 111 via second switch 117. When only the playback mode signal is generated by the microcomputer 104, the secret code signal detector 111 detects information from a preset position of the video signal supplied from the playback signal processor 112. Preferably, the preset position is the same position as that used in inserting the first secret code signal SECRET1 into the second composite video signal VBS2 from the concealing picture generator 107.

When the secret code signal generator 105 does not generate the second secret code signal SECRET2, the code discriminator 110 controls the second switch 117 to supply the output of the playback signal processor 112 to the display unit 115 regardless of the information detected by the secret code signal detector 111. The display unit 115 checks whether the horizontal sync signals exist in the received signal or not. When the input signal is determined as being the first composite video signal VBS1 with the horizontal sync signals, the display unit 115 presents the input first composite video signal VBS1 on a screen. Meanwhile, if the input signal is determined as the second composite video signal VBS2 without having the horizontal sync signals, the display unit 115 presents the OSD signal from the OSD signal generator 114 on the screen during the section of supplying the composite video signal without having the horizontal sync signals.

When the picture concealment release signal and secret number signal are generated by the user's new key manipulation while the microcomputer 104 operates under the playback mode, the secret code signal generator 105 produces the second secret code signal SECRET2 supplied to the code discriminator 110 coinciding with the secret number signal. The code discriminator 110 determines whether the second secret code signal SECRET2 is identical to the detected information from the secret code signal detector 111 or not. If it is determined that the detected information is not identical to the second secret code signal SECRET2, the code discriminator 110 controls the second switch 117 to supply the output of the playback signal processor 112 directly to the display unit 115.

When it is determined that the detected information is identical to the second secret code signal SECRET2, the code discriminator 110 controls the second switch 117 to supply the output of the playback signal processor 112 to the horizontal sync signal inserter 113. By controlling the switching of the second switch 117, the first composite video signal VBS1 from the playback signal processor 112 is supplied to the display unit 115, and the second composite video signal VBS2 is supplied to the horizontal sync signal inserter 113 which detects the first secret code signal SECRET1 from the preset position of each field of the second composite video signal VBS2 output from the second switch 117. Once the first code signal SECRET1 is detected, the horizontal sync signal inserter 113 properly inserts the horizontal sync signals into the field of the second composite video signal VBS2 to which the first secret code signal SECRET1 is inserted, so that the third composite video signal VBS3 is produced and supplied to the display unit 115. The horizontal sync signal inserter 113 advantageously generates a reference horizontal sync signal H-SYNC for regulating the speed of supplying the composite video signal to the playback signal processor 112 via the amplifier 108. In accordance with the reference horizontal sync signal H SYNC, the amplifier 108 regulates the driving speed of a head drum driving motor (not shown). The display unit 115 thus presents the first or third composite video signal VBS1 or VBS3 on the screen.

The player for picture concealment and concealment release according to the present invention as described above can hide a desired picture from viewing on a screen by means of secret numbers and horizontal sync signals, and presents the concealed picture on the screen by means of the secret numbers as required, so that an unauthorized person cannot inspect recorded picture information. Preferably, by using a key for setting an image concealing section, only the pictures desired by a user will be concealed. The present player for picture concealment and concealment release can be used to help the government, military authorities, public bodies and other enterprises to maintain secrecy while helping individuals maintain privacy. Furthermore, the present invention is useful for education by allowing answers of language education and general education programs, etc., to be concealed and selectively reproduced.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A player for picture concealment and concealment release during respective recording and reproducing modes of operation of a video signal with respect to a recording medium, comprising:

a head;

a key input device;

secret code generating means for generating either one of a first secret code signal associated with the recording mode and a second secret code signal associated with the reproducing mode in response to operation of a selected key in said key input device by a user;

picture concealing means, receiving an externally-provided first video signal, for inserting said first secret code signal at a preset position of said first video signal and eliminating horizontal sync signals from said first video signal, thereby generating a second video signal, and supplying said second video signal to said head;

information detecting means, receiving said second video signal read out via said head, for detecting information at said preset position of the received second video signal, and for providing the detected information and said second video signal;

secret code discriminating means, receiving said detected information, for determining whether said second secret code from said secret code generating means is identical to said detected information or not;

picture concealment releasing means for supplying a selected one of said second video signal from said information detecting means and a third video signal obtained by inserting respective horizontal sync signals, which signals were eliminated by said picture concealing means, into said second video signal in response to a result of the determination by said secret code discriminating means; and display means for displaying one of said second and said third video signals.

2. The player for picture concealment and concealment release as claimed in claim 1, wherein said head is a record/playback head for selectively recording and reproducing one of said first and said second video signals from a magnetic tape.

3. The player for picture concealment and concealment release as claimed in claim 1, wherein said secret code generating means comprises:

controlling means for selectively generating a recording mode signal, a reproducing mode signal and a secret number signal in response to operation of said selected key by the user; and secret code signal generating means for generating said first secret code signal responsive to said secret number signal when said recording mode signal and said secret number signal are supplied from said controlling means, and for generating said second secret code signal responsive to said secret number signal when said reproducing mode signal and said secret number signal are supplied from said controlling means.

4. The player for picture concealment and concealment release as claimed in claim 1, wherein said picture concealing means comprises:

first signal processing means for detecting a vertical sync signal from said first video signal, and providing the detected vertical sync signal and said first video signal;

secret code signal output means for supplying said first secret code signal generated by said secret code generating means responsive to said detected vertical sync signal from said first signal processing means; and concealing picture generating means for generating said second video signal by inserting said first secret code signal from said secret code signal output means into said first video signal and by eliminating said horizontal sync signals of a field including said first secret code signal.

5. The player for picture concealment and concealment release as claimed in claim 4, wherein said secret code signal output means outputs said first secret code signal so as to permit insertion of said first secret code signal in a vertical blanking section of said first video signal.

6. The player for picture concealment and concealment release as claimed in claim 1, wherein said picture concealment releasing means comprises:

horizontal sync signal inserting means for generating said third video signal when it is determined that said information detected by said secret code discriminating means is identical to said second secret code signal and for providing said third video signal to said display means; and means for providing said second video signal from said information detecting means to said display means when it is determined that said detected information is not identical to said second secret code signal.

7. The player for picture concealment and concealment release as claimed in claim 1, wherein said display means further comprises an on screen display signal generator means for generating an on screen display signal for display on a screen when said second video signal is supplied from said picture concealment releasing means.

8. A player for picture concealment and concealment release during respective recording and reproducing modes of operation for processing a video signal with respect to a recording medium, comprising:

a head;

a plurality of keys;

secret code generating means for selectively generating a picture concealing section signal and a first secret code signal indicative of the recording mode and a second secret code signal for releasing picture concealment indicative of the reproducing mode in response to operation of a selected one of said keys by a user;

picture concealing means, receiving an externally provided first video signal, for generating a second video signal lacking horizontal sync signals, said sync signals being eliminated from said first video signal, and having said first secret code signal inserted at a preset position in said second video signal, and for supplying said first video signal to said head during an interval wherein said second video signal and said picture concealing section signal are not provided to thereby permit recording a selected one of said first video signal and said second video signal on said recording medium as a recorded video signal;

information detecting means, receiving said recorded video signal read out via said head, for detecting information at said preset position of said recorded video signal;

secret code discriminating means for determining whether said second secret code from said secret code generating means is identical to said detected information or not when said second secret code signal is supplied from said secret code generating means, and producing a determination result;

picture concealment releasing means for selectively supplying one of said recorded video signal from said information detecting means and a third video signal obtained by inserting said horizontal sync signals, which sync signals were eliminated by said picture concealing means, into said recorded video signal corresponding to said second video signal, in response to said determination result; and display means for displaying the respective video signal output from said picture concealment releasing means on a screen.

9. The player for picture concealment and concealment release as claimed in claim 8, wherein said head is a record/playback head for a magnetic tape.

10. The player for picture concealment and concealment release as claimed in claim 8, wherein said secret code generating means comprises:

- a control circuit generating a recording mode signal and a reproducing mode signal, said picture concealing section signal, a picture concealment release signal and a secret number signal in response to operation of said selected key; and
- a secret code signal generating circuit generating said first secret code signal responsive to said secret number signal when said recording mode signal, said picture concealing section signal and said secret number signal are supplied from said control circuit, and generating said second secret code signal responsive to said secret number signal when said reproducing mode signal, said picture concealment release signal and said secret number signal are supplied from said control circuit.

11. The player for picture concealment and concealment release as claimed in claim 10, wherein said picture concealing means comprises:

- a first signal processing circuit detecting a vertical sync signal from said externally provided first video signal, and providing the detected vertical sync signal and said first video signal;
- a secret code signal output circuit supplying said first secret code signal generated by said secret code generating means at a moment corresponding to a vertical blanking section of said first video signal in accordance with said vertical sync signal;
- a concealing picture generating circuit generating said second video signal by inserting said first secret code signal from said secret code signal output circuit into said first video signal and eliminating said horizontal sync signals of a field having said first secret code signal; and
- a first switch supplying said first video signal from said first signal processing circuit to said concealing picture generating means while said picture concealing section signal is supplied to said first switch from said control circuit, and supplying said first video signal from said first signal processing circuit to said head while said picture concealing section signal is not supplied to said first switch.

12. The player for picture concealment and concealment release as claimed in claim 8, wherein said picture concealment releasing means comprises:

- a horizontal sync signal inserting circuit receiving the received video signal from said information detecting means, thereby generating said third video signal, and providing said third video signal to said display portion; and
- a second switch selectively supplying said received video signal from said information detecting means to said horizontal sync signal inserting circuit and display means in response to said determination result.

13. The player for picture concealment and concealment release as claimed in claim 12, wherein said second switch is selectively switched so as to supply said receiver video signal from said information detecting means to said horizontal sync signal inserting circuit when said secret code discriminating means determines that said detected information is identical to said second secret code signal, and to supply said received video signal from said information detecting means to said display means when said detected information is not identical to said second secret code signal.

14. The player for picture concealment and concealment release as claimed in claim 8, wherein said display means further comprises an on screen display signal generator for generating an on screen display signal for display on said screen when said second video signal is directly supplied to said display means.

* * * * *